(12) United States Patent
Baik et al.

(10) Patent No.: US 11,232,876 B2
(45) Date of Patent: Jan. 25, 2022

(54) STANDARD FOR MOBILE EQUIPMENT FOR MEASURING STRUCTURAL DEFORMATION OF NUCLEAR FUEL ASSEMBLY

(71) Applicant: KEPCO NUCLEAR FUEL CO., LTD., Daejeon (KR)

(72) Inventors: Mun Seog Baik, Daejeon (KR); Gi Bong Kil, Daejeon (KR); Kyung Hun Chang, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 20 days.

(21) Appl. No.: 16/633,487

(22) PCT Filed: Sep. 29, 2017

(86) PCT No.: PCT/KR2017/011025
§ 371 (c)(1),
(2) Date: Jan. 23, 2020

(87) PCT Pub. No.: WO2019/022298
PCT Pub. Date: Jan. 31, 2019

(65) Prior Publication Data
US 2020/0279663 A1    Sep. 3, 2020

(30) Foreign Application Priority Data
Jul. 25, 2017   (KR) .................. 10-2017-0094229

(51) Int. Cl.
*G21C 17/06*        (2006.01)
*G01B 11/16*        (2006.01)

(52) U.S. Cl.
CPC .............. *G21C 17/06* (2013.01); *G01B 11/16* (2013.01)

(58) Field of Classification Search
CPC ........ G01B 11/16; G21C 17/06; G21C 3/334; G21F 5/012; G21F 5/06; Y02E 30/30
(Continued)

(56) References Cited

U.S. PATENT DOCUMENTS 4,175,000 A     11/1979  Jabsen
6,328,524 B1 *  12/2001  Johnston ............... B66C 19/005
                                                        414/460
(Continued)

FOREIGN PATENT DOCUMENTS

JP         06058426 B2    8/1994
JP       2012503173 A     2/2012
(Continued)

OTHER PUBLICATIONS

International Search Report issued by ISA/KR in connection with PCT/KR2017/011025 dated Jun. 26, 2018.

*Primary Examiner* — Roy M Punnoose
(74) *Attorney, Agent, or Firm* — Levenfeld Pearlstein, LLC

(57) ABSTRACT

Provided is a standard for mobile equipment for measuring structural deformation of a nuclear fuel assembly, the standard including: a fixed frame fixed to one side of measuring equipment accommodated in a container; a standard member configured to be attached to and detached from the fixed frame, to rotate with one end portion of the fixed frame as a center, and to correspond to a nuclear fuel assembly standard specification, wherein an upper plate provided with a coupling means configured to be coupled with a transport device is coupled on one end portion of the standard member, a lower plate configured to be erected upright on and fixed to one side of the measuring equipment is coupled on an opposite end portion of the standard member.

5 Claims, 6 Drawing Sheets

(58) Field of Classification Search
USPC .......................................................... 356/601
See application file for complete search history.

(56) References Cited

U.S. PATENT DOCUMENTS

| | | | | |
|---|---|---|---|---|
| 7,388,369 | B2* | 6/2008 | Edsinger ................ | G21C 17/06 |
| | | | | 324/230 |
| 8,885,789 | B2* | 11/2014 | Lavios ................... | G21C 19/02 |
| | | | | 376/258 |
| 8,995,605 | B2* | 3/2015 | Chang ...................... | G21F 5/06 |
| | | | | 376/272 |
| 10,504,629 | B2* | 12/2019 | Ahlberg ................. | G21D 3/001 |
| 11,069,451 | B2* | 7/2021 | Baik ....................... | G21C 17/06 |
| 2007/0279050 | A1* | 12/2007 | Edsinger ............... | G01R 33/028 |
| | | | | 324/222 |
| 2012/0008729 | A1 | 1/2012 | Chang | |
| 2016/0012925 | A1* | 1/2016 | Ahlberg ................. | G21D 3/001 |
| | | | | 376/258 |
| 2020/0211723 | A1* | 7/2020 | Baik ....................... | G21C 17/06 |

FOREIGN PATENT DOCUMENTS

| | | | |
|---|---|---|---|
| KR | 1020080072618 | A | 8/2008 |
| KR | 1020120006177 | A | 1/2012 |
| KR | 1020130005975 | A | 1/2013 |
| KR | 101362707 | B1 | 2/2014 |

* cited by examiner

STANDARD FOR MOBILE EQUIPMENT FOR MEASURING STRUCTURAL DEFORMATION OF NUCLEAR FUEL ASSEMBLY

This is a National Stage Application of International Patent Application No. PCT/KR2017/011025, filed Sep. 29, 2017, which claims the benefit of and priority to Korean Patent Application No. 10-2017-0094229, filed Jul. 25, 2017, the entirety of which are incorporated fully herein by reference.

TECHNICAL FIELD

The present invention relates to a standard for mobile equipment for measuring structural deformation of a nuclear fuel assembly and, more particularly, to a standard for mobile equipment for measuring structural deformation of a nuclear fuel assembly, which enhances accuracy of measuring the structural deformation of the nuclear fuel assembly through calibration work of a scanner using a standard member corresponding to a nuclear fuel assembly standard specification.

BACKGROUND ART

A nuclear power plant is configured to heat a primary coolant using energy generated during nuclear fission by using nuclear fuel inside a nuclear reactor, to transfer heated energy of the primary coolant to a steam generator, thereby transferring the energy to a secondary coolant and generating steam in the steam generator, to rotate a turbine using the steam, and to convert rotational energy of the turbine into electric power by a generator.

Energy sources for the nuclear fission are provided by the nuclear fuel.

The nuclear fuel arranged inside the nuclear reactor is composed of nuclear fuel assemblies 10, with each nuclear fuel assembly as a unit, as shown in FIG. 1, and the nuclear fuel assembly 10 includes a framework composed of a top nozzle 11, a bottom nozzle 12, and spacer grid assemblies 13; and nuclear fuel rods 20 each inserted into the spacer grid assemblies 13 and supported by springs and dimples provided in the spacer grid assemblies 13.

At this time, each of the nuclear fuel rods 20 is composed of a plurality of uranium pellets 21 and a zirconium alloy cladding tube 22 provided in the form of a long bar for protecting the uranium and preventing radiation leakage.

In manufacturing such a nuclear fuel assembly 10, in order to prevent scratches on a surface of the nuclear fuel rod 20 and to prevent damage to the spacer grid assemblies 13, lacquer is applied to the surface of the nuclear fuel rod 20. Thereafter, a plurality of the nuclear fuel rods 20 is inserted into the framework, followed by attaching and fixing the top and bottom nozzles 11 and 12, whereby the assembly of the nuclear fuel assembly 10 is completed.

Thereafter, after removing the lacquer of the completed nuclear fuel assembly 10, a process of manufacturing the nuclear fuel assembly 10 is completed by inspecting gaps, warpage, full length, dimensions, and the like between the nuclear fuel rods 20.

Meanwhile, the nuclear fuel assembly 10, the manufacturing process of which is completed as described above, is not directly introduced into the nuclear reactor but is inspected to determine whether the nuclear fuel assembly 10 is structurally deformed.

This is for preventing a collision between neighboring fuel assemblies 10 in a process of arranging a plurality of fuel assemblies 10 in the nuclear reactor.

That is, when structural deformation occurs in the nuclear fuel assembly during structural assembling of the nuclear fuel assembly 10, the collision with the neighboring nuclear fuel assemblies 10 may occur, and thus the cladding tube 22 of the nuclear fuel rod 20 may be damaged. When the cladding tube 22 of the nuclear fuel rod 20 is damaged, radioactivity may be excessively leaked from the nuclear fuel, thereby intensifying contamination of the primary coolant. In the case of severe damage, the nuclear fuel rods 20 may be dropped out and moved inside the nuclear reactor, thereby causing a highly risky situation.

Therefore, since the nuclear fuel assembly 10 is required to have a high degree of reliability with respect to quality thereof, work of inspecting the structural deformation of the nuclear fuel assembly 10 is obviously a very important task.

Accordingly, it is urgent to develop equipment for measuring and inspecting the structural deformation of the nuclear fuel assembly 10.

Naturally, as disclosed in the related art, equipment for measuring a structure of the nuclear fuel assembly 10 has been provided but has been limited to measurement of a structure of the spacer grid assemblies 13 of the nuclear fuel assembly 10, thereby having a problem of being limited in measuring the nuclear fuel assembly 10 as a whole.

In particular, in measuring whether or not the nuclear fuel assembly 10 is structurally deformed, because no calibration work has been performed on measuring means and no standard has been provided for the calibration of the measuring means, there has been a problem in that accuracy of measuring the nuclear fuel assembly 10 has been difficult to be enhanced.

Documents of Related Art
[Patent Document]
(Patent Document 1) Korean Patent No. 10-1244865

DISCLOSURE

Technical Problem

Accordingly, the present invention has been made keeping in mind the above problems occurring in the related art, and an object of the present invention is to provide a standard for mobile equipment for measuring structural deformation of a nuclear fuel assembly, wherein a standard member corresponding to a nuclear fuel assembly standard specification is provided in the measuring equipment in order to allow the calibration work of a scanner to be performed.

Technical Solution

In order to accomplish the above object, the present invention provides a standard for mobile equipment for measuring structural deformation of a nuclear fuel assembly, the standard comprising: a fixed frame fixed to one side of measuring equipment accommodated in a container; and a standard member configured to be detachable to the fixed frame, to rotate around one end portion of the fixed frame, and to correspond to a nuclear fuel assembly standard specification, wherein an upper plate provided with a coupling means configured to be coupled with a transport device is coupled on one end portion of the standard member, and a lower plate configured to be erected upright on and fixed to one side of the measuring equipment is coupled on an opposite end portion of the standard member.

At this time, the fixed frame may include: a protective cover provided with an accommodating groove configured to accommodate the standard member and with a fastening means configured to prevent the standard member accommodated in the accommodating groove from being removed; a lower support provided below the protective cover and fixed to the container; and an upper support installed between the protective cover and the lower support and configured to fix the protective cover to the lower support.

At this time, a plurality of buffer members may be further provided between both side parts of the upper support and the lower support, in a longitudinal direction of the lower support.

In addition, through holes may be provided on both side portions of one end portion of the protective cover; a shaft hole corresponding to the through holes may be provided on the one end portion of the standard member; and a rotating pin through the through holes and the shaft hole may be provided to allow the standard member to rotate with the one end portion of the protective covers.

Advantageous Effects

As described above, the standard for the mobile equipment for measuring structural deformation of the nuclear fuel assembly according to the present invention has following effects.

Since calibration work of the scanner, which is a measuring means, can be performed accurately, there is an effect that accuracy of measuring the nuclear fuel assembly can be enhanced.

That is, by providing a standard member corresponding to the nuclear fuel assembly standard specification, and by allowing the scanner to be calibrated with the standard member as a reference, the accuracy of measuring the nuclear fuel assembly through the calibrated scanner can be enhanced compared to measured value without the calibration work.

In addition, even when the structural deformation of the column in which the scanner is installed occurs, there is an effect that it is possible to always uniformly maintain the accuracy of measuring the fuel assembly through the calibration work through the standard member.

BEST MODE

Terms or words used in the present specification and claims are not to be construed as limiting to usual or dictionary meanings thereof. On the basis of a principle that the inventors may properly define the concept of terms in order to best explain the invention thereof in the best way possible, it should be interpreted as meaning and concept corresponding to the technical idea of the present invention.

Hereinafter, a standard for mobile equipment for measuring structural deformation of a nuclear fuel assembly (hereinafter referred to as "standard") according to an exemplary embodiment of the present invention will be described with reference to the accompanying FIGS. 2 to 6.

The standard has a technical feature provided for scanner calibration for the mobile equipment for measuring the nuclear fuel assembly.

That is, by providing a standard member corresponding to a nuclear fuel assembly standard specification, and by allowing the scanner to be calibrated through the standard member, accuracy of measuring the nuclear fuel assembly through the scanner may be enhanced.

Figure 1:
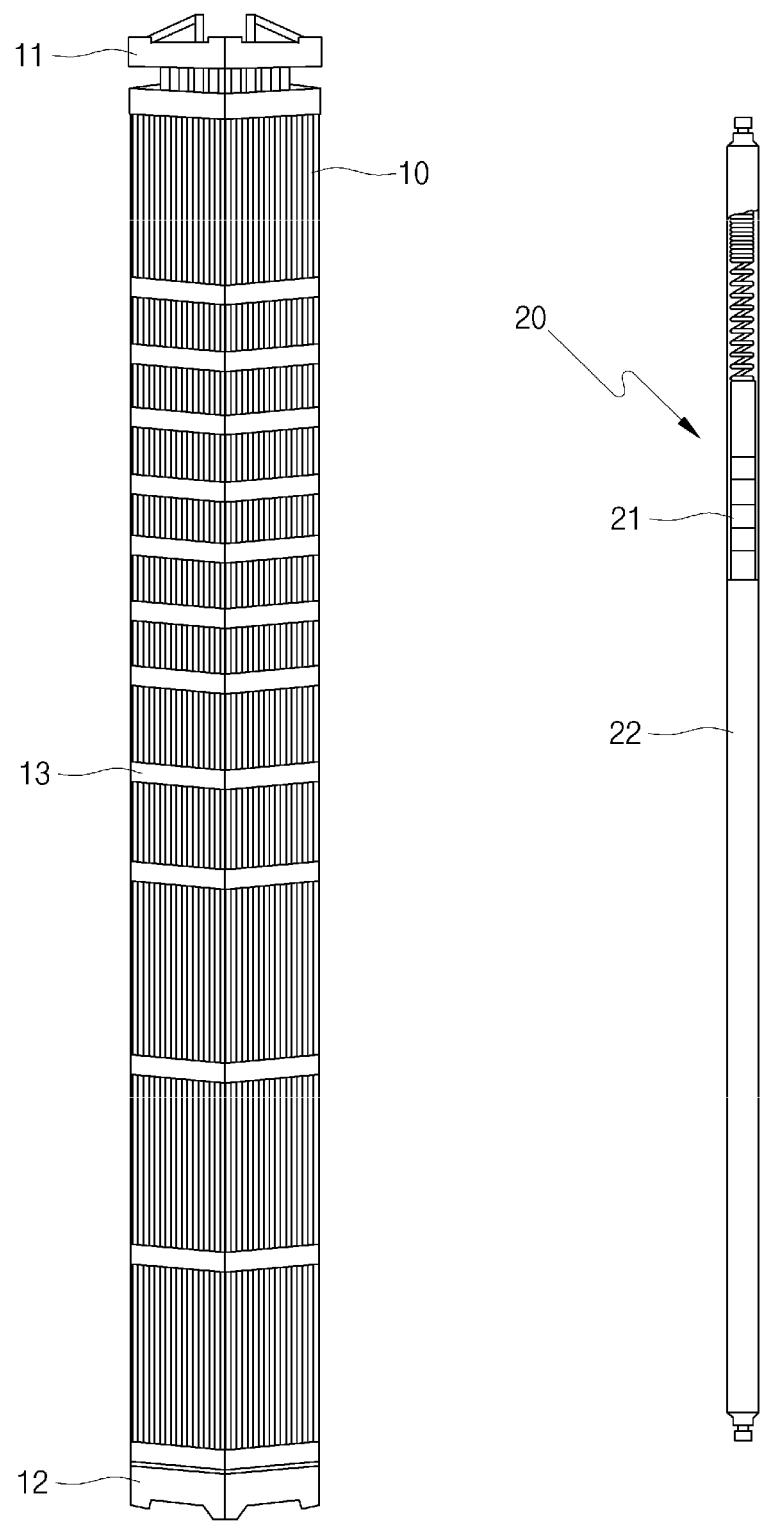
FIG. 1 is a view showing a nuclear fuel assembly and a nuclear fuel rod, each as a single unit.
Figure 2:
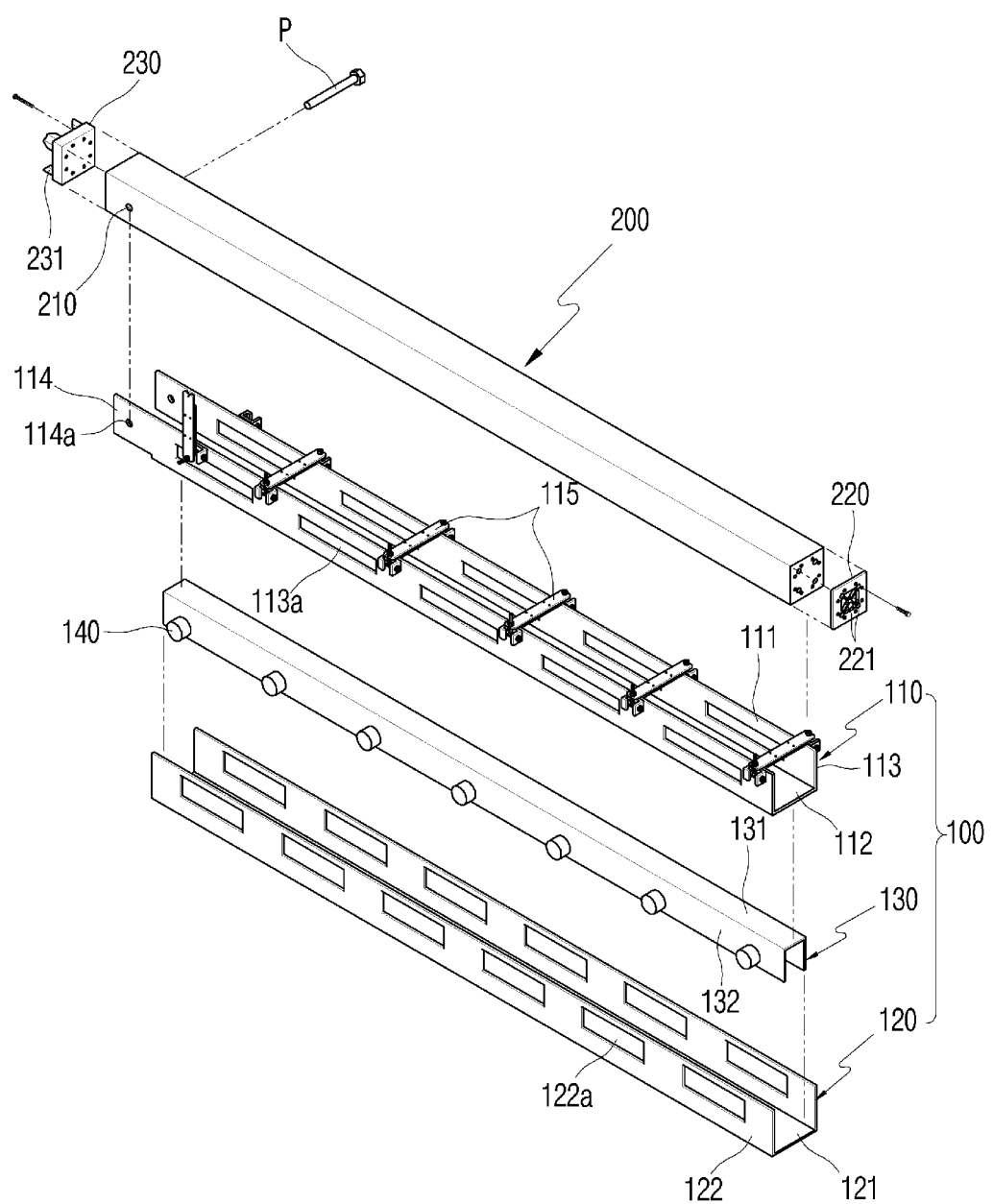
FIG. 2 is an exploded perspective view showing a standard for mobile equipment for measuring structural deformation of a nuclear fuel assembly according to an exemplary embodiment of the present invention.

As shown in FIG. 2, the standard includes a fixed frame 100 and a standard member 200.

The fixed frame 100 is configured to fix the standard member 200, and is installed inside the container protecting the measurement equipment. The "fixed frame" is also referred to herein as a "fixing frame".

The fixed frame 100 includes a protective cover 110, a lower support 120, and an upper support 130.

The protective cover 110 protects the standard member 200 and is a portion to and from which the standard member 200 is attached and detached.

The protective cover 110 is provided with an accommodating groove 111 to accommodate the standard member 200, wherein the accommodating groove 111 corresponds to a shape of the standard member 200.

As the standard member 200 is provided in a quadrangular shape, the accommodating groove 111 also has a quadrangular shape corresponding thereto, wherein a top portion of the accommodating groove 111 is open, whereby the standard member 200 may enter or exit the accommodating groove 111 therethrough.

The protective cover 110 configured as described above is provided in a "U" shape consisting of a bottom surface 112 and opposite side parts 113, wherein the opposite side portions 113 of the protective cover 110 may be each provided with through holes 113a so as to reduce production cost and weight.

In addition, both side portions of one end of the protective cover 110 may be each composed of extension portions 114 provided to extend to the outside.

That is, only the opposite side parts 113 except the bottom surface 112 are configured to be provided to extend.

At this time, the extension parts 114 are provided with a through hole 114a penetrating both sides.

The through hole 114a is configured to allow a rotating pin P to be passed so that the standard member 200 is axially coupled thereto.

As such, the standard member 200 may be axially coupled to the extension portions 114 having no bottom surface 112 and thus may not interfere with the bottom surface 112 when rotating. Accordingly, rotation of the standard member 200 may be smoothly performed.

In addition, a fastening means 115 is installed at an opened portion of the protective cover 110.

The fastening means 115 is configured to prevent the standard member 200 positioned in the accommodating groove 111 from being removed from the open portion.

Figure 3:
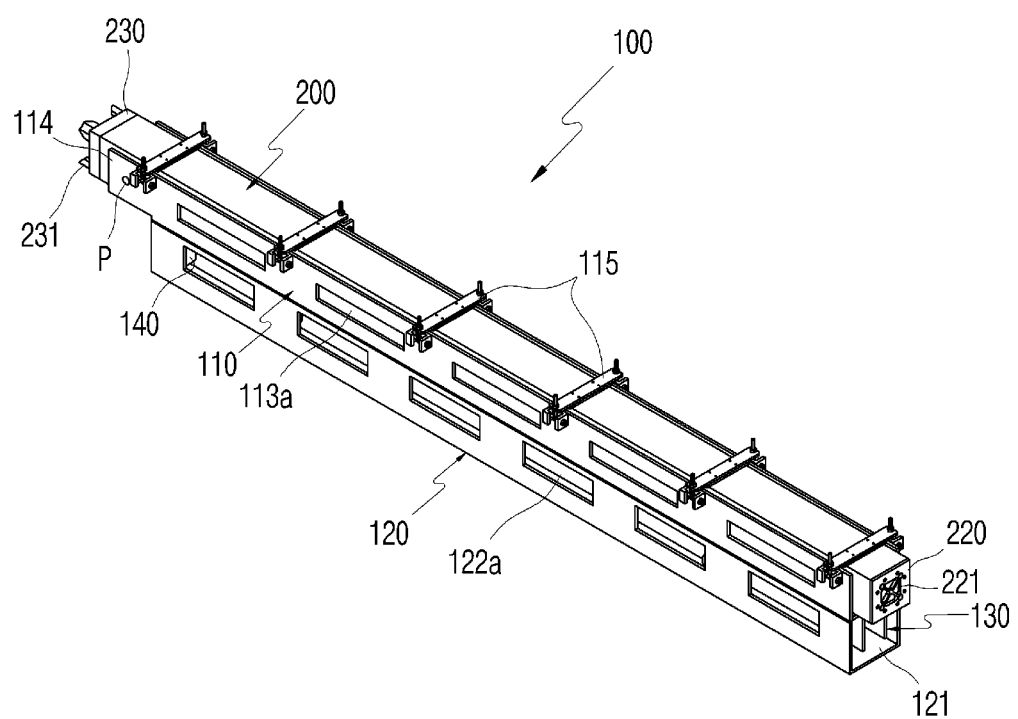
FIG. 3 is a perspective view showing the standard for the mobile equipment for measuring structural deformation of the nuclear fuel assembly according to the exemplary embodiment of the present invention.

That is, when transporting the measuring equipment, the standard member 200 is transported in a state of being laid in the accommodating groove 111 as shown in FIG. 3. At this time, because the fastening means 115 is blocking the opened portion of the protective cover 110, the standard member 200 may be prevented in advance from being removed or moved upward.

In a longitudinal direction of the standard member 200, the rotating pin P is coupled to the protective cover 110, so that escape of the standard member 200 from the protective cover 110 does not occur.

The plurality of the fastening means 115 may be provided in the longitudinal direction of the protective cover 110, but not limited to a specific configuration.

As shown in FIGS. 2 and 3, one end of the fastening means 115 may be hinged to one side of the protective cover 110, and an opposite end of the fastening means 115 may be configured to fold upwardly or to fasten to an opposite side of the protective cover 110, with the one end of the fastening means 115 as the center.

In addition, the lower support 120 is a configured to fix the protective cover 110 to the inside of the container of the measuring equipment and is located under the protective cover 110.

The lower supporter 120 is fixed to the inside of the container and, the same as the protective cover 110, may be in the "U" shape consisting of a bottom surface 121 and opposite side parts 122.

In addition, the through holes 122a may also be provided at the opposite side parts of the lower support 120.

In addition, the upper support 130 serves to support the protective cover 110 to the lower support 120 and is fixed between the protective cover 110 and the lower support 120.

At this time, the upper support 130 fixing means is not limited to a specific one and may be provided by a fixing means such as bolts and the like.

At this time, the upper support 130 may include a top plate 131 corresponding to the bottom surface of the protective cover 110 and opposite side parts 132 bent downward from both sides of the top plate 131.

At this time, width of the upper support 130 is provided smaller than width of the lower support 120, the opposite side parts 132 of the upper support 130 are located in the space between the opposite side parts 122 of the lower support 120.

On the other hand, buffer members 140 may be further provided on both side parts 132 of the upper support 130, respectively.

This is to attenuate that vibration of the lower support 120 fixed to the container is transferred to the protective cover 110 in which the standard member 200 is installed.

Figure 5:
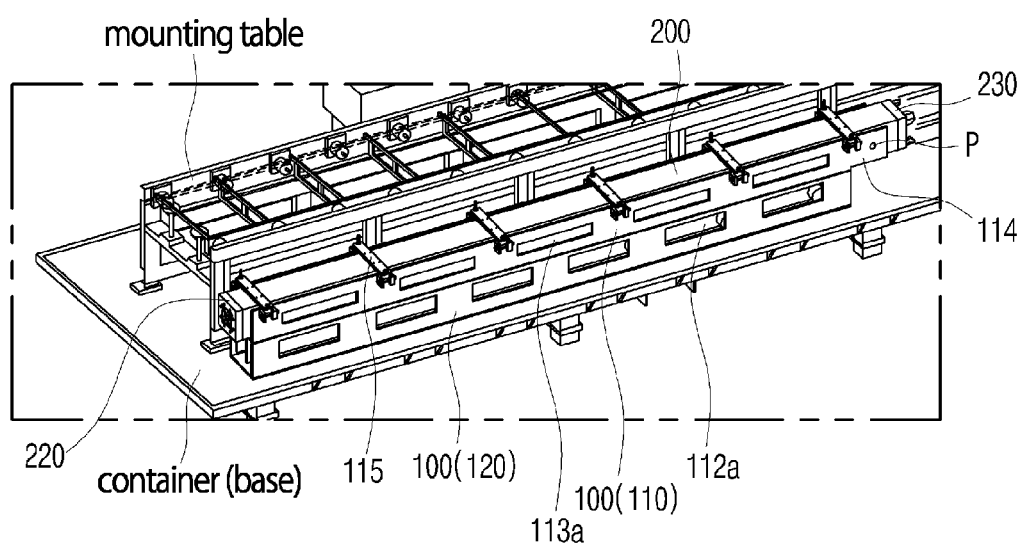
FIG. 5 is a perspective view of main parts showing a state where the standard for the mobile equipment for measuring structural deformation of the nuclear fuel assembly according to the exemplary embodiment of the present invention is installed on one side of the measuring equipment inside a container.

That is, since the lower support 120 is located between the container and the standard member 200, as shown in FIG. 5, the vibration may be transferred from the container to the standard member 200 when transporting the container. At this time, the buffer member 140 interposed between the lower support 120 and the upper support 130 may attenuate the vibration, thereby preventing the standard member 200 from being damaged.

Next, the standard member 200 is a standard specification member for calibrating a scanner for measuring the nuclear fuel assembly.

Standard member 200 is provided in a straight line and may be made of stone.

This is to prevent the standard member 200 from being deformed even after a long period of time.

The standard member 200 is made in a form corresponding to the accommodating groove 111 of the protective cover 110, and the length of the standard member 200 is provided to be longer than length of the protective cover 110 as shown in FIG. 3.

This is to ensure that the rotation of the standard member 200 is smoothly accomplished on the protective cover 110.

To this end, a shaft hole 210 is provided on both sides of one end of the standard member 200.

Here, the shaft hole 210 is provided in a shape corresponding to the through hole 114a of the protective cover 110.

On the other hand, the rotating pin P is provided to provide a rotating reference of the standard member 200 by passing through the through hole 114a of the protective cover 110 and the shaft hole 210 of the standard member 200.

That is, in order to move the standard member 200 from the protective cover 110, the standard member 200 is to be erected upright. To this end, the rotating pin P is configured to become a shaft when the standard member 200 is erected.

In addition, an upper plate 220 and a lower plate 230 are installed at both end portions of the standard member 200, respectively.

The upper plate 220 is a portion to which the transport means provided for erecting the standard member 200 is coupled in the process of erecting the standard member 200 with the rotating pin P as the center.

To this end, the upper plate 220 provides a coupling means 221 for coupling with the transport means.

The coupling means 221 is provided on the upper plate 220 and is good enough, provided the transport means such as a crane and the like is allowed to be hooked and coupled therewith.

Figure 4:
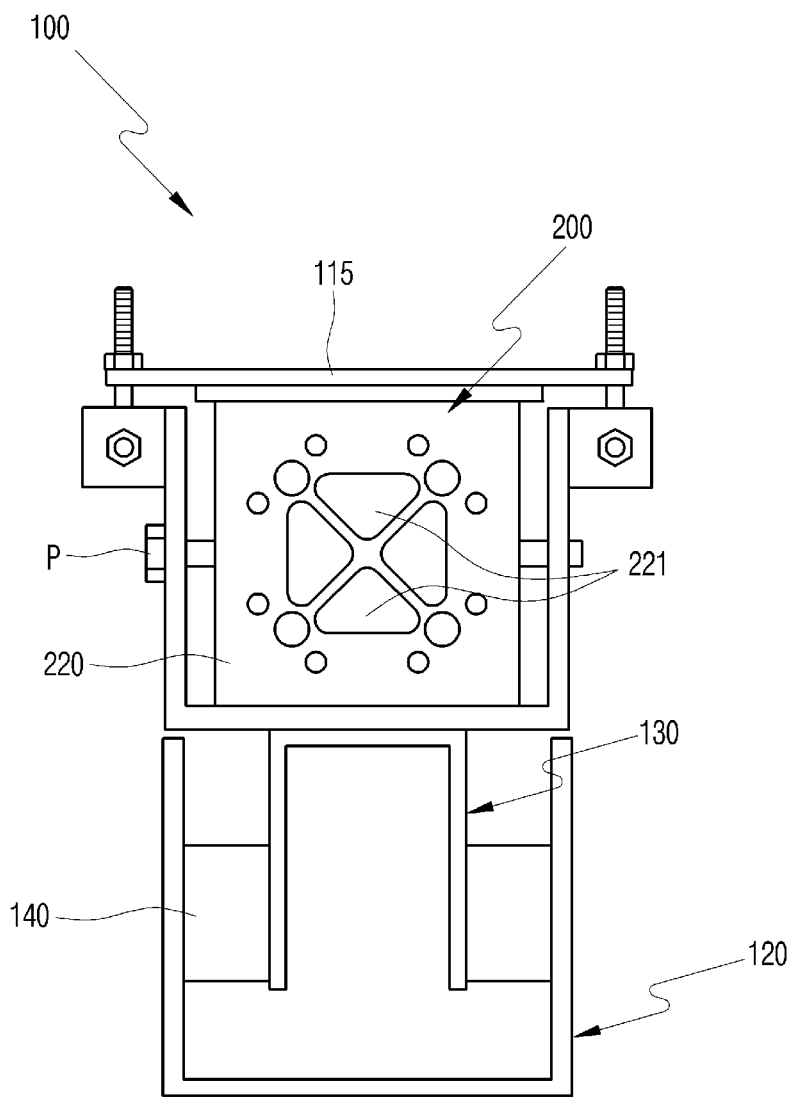
FIG. 4 is a front view showing the standard for the mobile equipment for measuring structural deformation of the nuclear fuel assembly according to the exemplary embodiment of the present invention.

The coupling means 221 may be provided in a ring shape, as shown in FIGS. 2 to 4, may be provided in a plurality of through holes.

In addition, the lower plate 230 is configured to stably erect the standard member 200 and is detachably attached to one end of the standard member 200.

Figure 6:
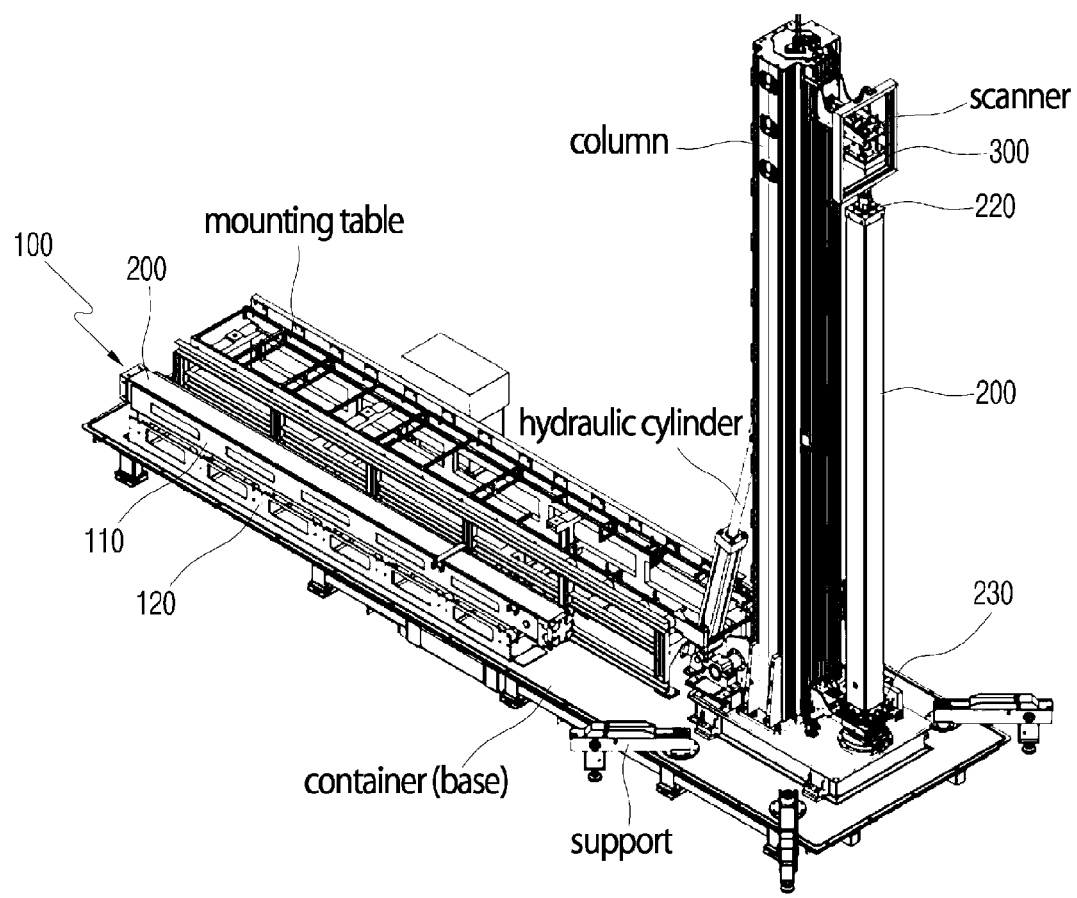
FIG. 6 is a perspective view showing a state where calibration work of the scanner is performed by using the standard for the mobile equipment for measuring structural deformation of the nuclear fuel assembly according to the exemplary embodiment of the present invention.

The standard member 200 is configured to perform the calibration work of the scanner. To this end, the standard member 200 should be erected upright by being adjacent to one side of the column as shown in FIG. 6. Since the lower plate 230 may be fixed to a floor adjacent to the one side of the column, the standard member 200 may be stably erected upright.

To this end, the lower plate 230 includes an insertion protrusion 231, and an insertion means for inserting the insertion protrusion 231 may be provided on the floor adjacent to the one side of the column.

Hereinafter, the use of the standard configured as described above will be examined.

The measuring equipment stored in the container is transported to a measurement site.

In this case, the container may be transported by land, sea, or air.

Meanwhile, the container transported to the measurement site is removed of the cover thereof for measuring the nuclear fuel assembly, whereby the measuring equipment provided on a base is exposed to the outside.

Next, as shown in FIG. 6, supports are rotated to and positioned at the outside of a boundary of the base, whereby the base is fixed to the ground without moving.

Next, as shown in FIG. 6, the column is erected upright by operating a hydraulic cylinder.

Next, in order to enhance the accuracy of measured values of the nuclear fuel assembly through the scanner, the calibration work of the scanner is performed.

To this end, the standard member provided on one side of the base is fixed to the transport means.

At this time, although not shown, a crane may be provided as the transport means.

Meanwhile, in order to connect the crane to the standard member 200, a transport hanger 300 may be provided as a connection medium between the crane and the standard member 200.

That is, after coupling the transport hanger 300 to the upper plate 220 of the standard member 200, the crane is to lift the transport hanger 300.

When the coupling of the transport hanger 300 to the coupling means 221 of the upper plate 220 is completed, the fastening means 115 is released to open the opened portion of the protective cover 110.

Next, when the transport hanger 300 is lifted by using a crane, the standard member 200 is rotated upward with the rotation pin P as the center.

Subsequently, the standard member 200 is erected upright while being rotated between the extension portions 114.

Next, the rotating pin P is separated from the through hole 114a of the protective cover 110 and the shaft hole 210 of the standard member 200.

Accordingly, the standard member 200 becomes to be in a state free to move on the protective cover 110.

Next, the standard member 200 is fixed to the floor adjacent to the one side of the column by operating the crane.

At this time, the insertion protrusion 231 provided on the lower plate 230 of the standard member 200 is coupled to the floor adjacent to the one side of the column, whereby the standard member 200 becomes to be in a state erected upright adjacent to the one side of the column as shown in FIG. 6.

Next, the calibration work of the scanner is performed through measuring the standard member 200 by operating the scanner.

That is, the calibration work is performed through the standard member 200 with respect to standard values such as length, envelope, slope, and the like of the nuclear fuel assembly input to the scanner.

Next, when the calibration work of the scanner has been completed, the standard member 200 is laid and seated on the accommodating groove 111 of protective cover 110 by performing the above-described series of procedures in reverse order.

Then, by fastening the fastening means 115, the calibration work of the scanner using the standard member 200 is completed.

As described above, the standard of the mobile equipment for measuring structural deformation of the nuclear fuel assembly according to the present invention has a technical feature that allows the calibration work of the scanner to be performed in the mobile equipment for measuring structural deformation of the nuclear fuel assembly.

That is, after the calibration work of the scanner is performed through the same standard member as the nuclear fuel assembly standard specification, it is possible to measure whether or not the nuclear fuel assembly structure is deformed, thereby increasing the accuracy of measuring the nuclear fuel assembly.

Therefore, the nuclear fuel assembly may be stably introduced into the nuclear reactor.

Although the present invention has been described in detail with respect to the described embodiments, it will be apparent to those skilled in the art that various modifications and variations are possible within the technical scope of the present invention, and such modifications and variations are within the scope of the appended claims.

DESCRIPTION OF THE REFERENCE NUMERALS IN THE DRAWINGS

| | |
|---|---|
| 100: fixed frame | 110: protective cover |
| 111: accommodating groove | |
| 112, 121: bottom surface | |
| 113, 122, 132: side portion | |
| 113a, 122a: through hole | |
| 114: extension portion | 114a: through hole |
| 115: fastening means | 120: lower support |
| 130: upper support | 131: top plate |
| 140: buffer member | 200: standard |
| 210: shaft hole | 220: upper plate |
| 221: coupling means | 230: lower plate |
| 231: insertion protrusion | |
| 300: transport hanger | |

The invention claimed is:

1. A standard device for a mobile equipment including a scanner for measuring structural deformation of a nuclear fuel assembly, the standard device comprising:
    a fixing frame for holding a standard member; the fixing frame configured to be fixed to one side of the mobile equipment accommodated in a container;
    the standard member configured to be detachably held in the fixing frame, to rotate around one end portion of the fixing frame, and to correspond to a nuclear fuel assembly standard specification;
    an upper plate attached to one end portion of the standard member, the upper plate including a coupling means for coupling with a transport device; and
    a lower plate attached to an opposite end portion of the standard member, the lower plate configured to facilitate the standard member to be stably erected upright on and fixed to one side of the mobile equipment,
wherein the standard member is a standard specification member for calibrating the scanner for measuring the nuclear fuel assembly to accurately measure the structural deformation of the nuclear fuel assembly.

2. The standard device of claim 1, wherein the fixing frame includes:
    a protective cover provided with an accommodating groove configured to accommodate the standard member and with a fastening means configured to prevent the standard member accommodated in the accommodating groove from being removed;
    a lower support provided below the protective cover and fixed to the container; and an upper support installed between the protective cover and the lower support and configured to fix the protective cover to the lower support.

3. The standard device of claim 2, wherein a plurality of buffer members are further provided between both side parts of the upper support and the lower support, in a longitudinal direction of the lower support.

4. The standard device of claim 3, wherein through holes are provided on both side portions of one end portion of the protective cover;
   a shaft hole corresponding to the through holes is provided on the one end portion of the standard member; and
   a rotating pin through the through holes and the shaft hole provided to allow the standard member to rotate around the one end portion of the protective covers.

5. The standard device of claim 2, wherein through holes are provided on both side portions of one end portion of the protective cover;
   a shaft hole corresponding to the through holes is provided on the one end portion of the standard member; and
   a rotating pin through the through holes and the shaft hole provided to allow the standard member to rotate around the one end portion of the protective covers.

* * * * *